United States Patent
Zhang et al.

(10) Patent No.: US 10,670,732 B2
(45) Date of Patent: Jun. 2, 2020

(54) NAVIGATION DEVICE AND METHOD FOR DETERMINING NAVIGATION INFORMATION

(71) Applicant: Intel Corporation, Santa Clara, CA (US)

(72) Inventors: Qiang Zhang, Rugby (GB); Geraint Ffoulkes-Jones, Daventry (GB)

(73) Assignee: Apple Inc., Cupertino, CA (US)

( * ) Notice: Subject to any disclaimer, the term of this patent is extended or adjusted under 35 U.S.C. 154(b) by 883 days.

(21) Appl. No.: 15/086,115

(22) Filed: Mar. 31, 2016

(65) Prior Publication Data

US 2017/0285175 A1 Oct. 5, 2017

(51) Int. Cl.
*G01S 19/40* (2010.01)
*G01S 19/39* (2010.01)
(Continued)

(52) U.S. Cl.
CPC ............... *G01S 19/40* (2013.01); *G01S 19/24* (2013.01); *G01S 19/39* (2013.01); *G01S 19/02* (2013.01); *G01S 19/05* (2013.01); *G01S 19/52* (2013.01)

(58) Field of Classification Search
CPC .......... G01S 19/40; G01S 19/02; G01S 19/05; G01S 19/24; G01S 19/39; G01S 19/52
(Continued)

(56) References Cited

U.S. PATENT DOCUMENTS 5,583,514 A * 12/1996 Fulop ................... H01Q 1/1257
342/359
6,023,242 A * 2/2000 Dixon ..................... H01Q 1/125
342/359
(Continued)

FOREIGN PATENT DOCUMENTS

EP 2813864 A2 12/2014

OTHER PUBLICATIONS

European Search Report based on application No. 17 158 541.7 (9 pages) dated Aug. 31, 2017 (for reference purpose only).
(Continued)

*Primary Examiner* — Chuong P Nguyen (57) ABSTRACT

It is proposed a determination device, a method for determining navigation information and a navigation device comprising: a receiving circuit configured to receive a first signal from a first navigation satellite, the first signal comprising a first timestamp; a determination circuit configured to determine a velocity of the first navigation satellite at the first timestamp in a second coordinate system based on ephemeris data of the first navigation satellite, the second coordinate system being tilted in relation to the equatorial plane; the determination circuit further configured to determine a velocity of the first navigation satellite in a first coordinate system that is earth fixed and rotating with earth, by applying a transformation matrix to the determined velocity of the first navigation satellite in the second coordinate system and adding a correction term based on a time derivative of the transformation matrix; a navigation circuit
(Continued)

configured to determine navigation information of the receiving circuit within the first coordinate system based on at least the determined velocity of at least the first navigation satellite.

25 Claims, 3 Drawing Sheets

(51) Int. Cl.
*G01S 19/24* (2010.01)
*G01S 19/02* (2010.01)
*G01S 19/52* (2010.01)
*G01S 19/05* (2010.01)

(58) Field of Classification Search
USPC ............ 342/357.23, 357.35, 357.39, 357.42, 342/357.63
See application file for complete search history.

(56) References Cited

U.S. PATENT DOCUMENTS

| 8,368,588 | B2* | 2/2013 | Weng ............... | G01S 19/27 |
| | | | | 342/357.25 |
| 8,963,772 | B2* | 2/2015 | Xu ..................... | G01S 19/05 |
| | | | | 342/357.49 |
| 8,997,121 | B2* | 3/2015 | Trethewey ........ | G01S 19/14 |
| | | | | 342/357.2 |
| 9,057,780 | B2* | 6/2015 | Bar-Sever ......... | G01S 19/13 |
| 9,182,229 | B2* | 11/2015 | Grasser ............. | G01C 15/00 |
| 9,453,903 | B2* | 9/2016 | Robinson .......... | G01S 19/11 |
| 2008/0186228 | A1* | 8/2008 | Garin ................ | G01S 19/258 |
| | | | | 342/357.62 |
| 2009/0009389 | A1* | 1/2009 | Mattos .............. | G01S 19/05 |
| | | | | 342/357.66 |
| 2010/0117897 | A1* | 5/2010 | Riley ................ | G01S 19/25 |
| | | | | 342/357.65 |
| 2011/0043404 | A1* | 2/2011 | Weng ................ | G01S 19/27 |
| | | | | 342/357.66 |
| 2015/0323677 | A1* | 11/2015 | Muraki .............. | G01S 19/25 |
| | | | | 342/357.25 |
| 2018/0172841 | A1* | 6/2018 | Miyajima .......... | G01C 21/28 |

OTHER PUBLICATIONS

Guangjun Liu et al., Real-Time Determination of a BDS Satellite's Velocity Using the Broadcast Ephemeris, 2014 Fourth International Conference on Instrumentation and Measurement ; Computer; Communication and Control, 2014, pp. 478 to 483, IEEE.

BeiDou Navigation Satellite System Signal in Space Interface Control Document, Open Service Signal (Version 2.0), China Satellite Navigation Office, Dec. 2013, 82 pages, China.

* cited by examiner

NAVIGATION DEVICE AND METHOD FOR DETERMINING NAVIGATION INFORMATION

TECHNICAL FIELD

Embodiments described herein generally relate to navigation devices and methods for determining navigation information.

BACKGROUND

Since the global positioning system (GPS) was introduced by the US military, new navigation satellite projects (e.g. by Russia (GLONASS), EU (Galileo)) have been lunched in order to give an alternative, improve or complement the existing GPS. Suppliers of navigation equipment see the value of trying to make use of all of the systems to get better navigation information and/or better coverage in built up areas where there are lots of blockages. One of these new navigation satellite projects is Chinas BeiDou Navigation Satellite System (BDS). BDS uses the same form of ephemeris as GPS for their IGSO (inclined geosynchronous orbit) and MEO (medium earth orbit) satellites. Unlike GPS, BDS also makes use of geostationary satellites and had to introduce a new form of ephemeris to support them. BDS introduces a new form for providing ephemeris data for geostationary satellites, wherein the ephemeris data is provided in relation to a reference plane that is tilted in reference to the equatorial plane. This is because for the geostationary orbits, which are over the equator, the orbit inclination would be near zero (or even zero) in classic GPS ephemeris form which can results in a singularity in the Keplerian orbit math. Determination of position and velocity of geostationary satellites is important for determining accurate navigation information (e.g. user position and/or user velocity), since an orbit of a geostationary satellite is influenced by a couple of factors. E.g. most geostationary orbits are instable (unstable) due to inhomogeneities in the earths form and due to influences of sun and moon, which causes a longitudinal drift of the satellite (especially if the orbit is not exactly geostationary) and therefore may need correction (from time to time). Further it is challenging to position a satellite in an exact geostationary orbit, which causes the satellite to move (wobble) in a small ellipse or FIG. 8 (in relation to a fixed point on earth). Therefore position and velocity of satellites positioned in geostationary orbits vary (slightly) which needs to be considered when calculating navigation information.

DESCRIPTION

Figure 1:
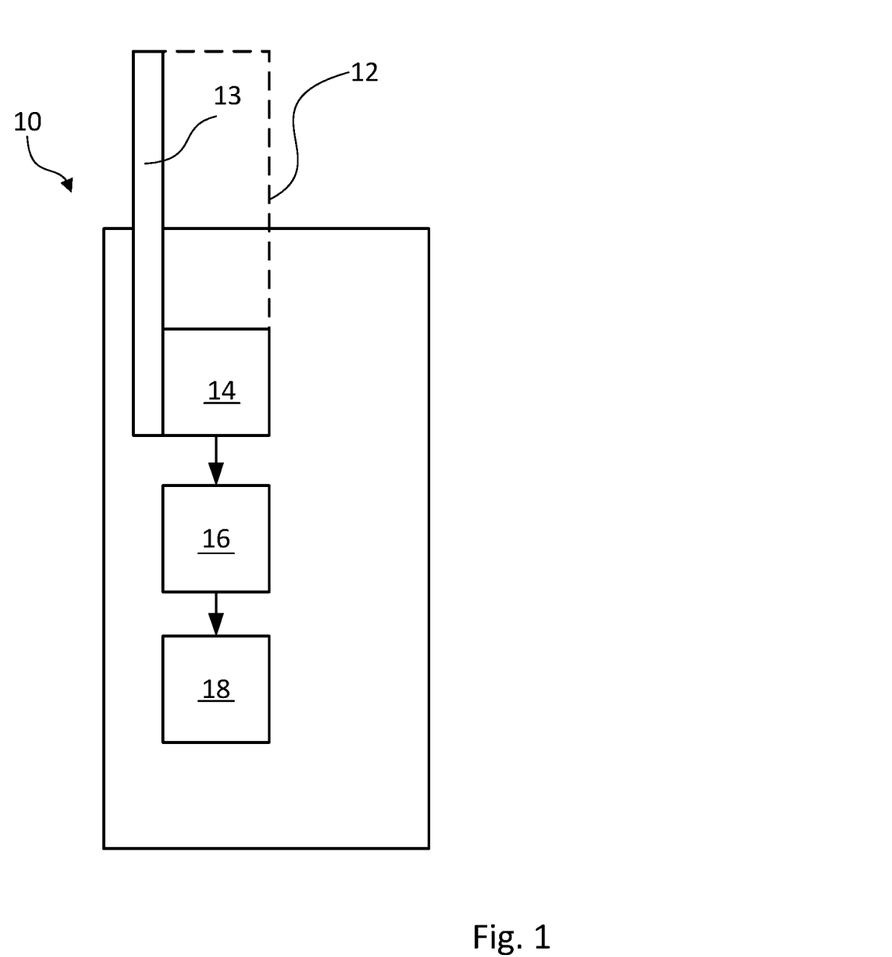
FIG. 1 shows a schematic view of a navigation device.

FIG. 1 shows a navigation device 10. The navigation device 10 may be a standalone/handheld device. The navigation device 10 may be included in a compound device, e.g. a cellphone/mobile phone/smartphone, and/or in a vehicle, e.g. a car, ship, air plane, etc. The navigation device may include a display for displaying navigation and/or map-data. The navigation device may include a pathfinding circuit configured to calculate a path between two given points according to map data. The navigation device may include a data link to transmit user positions to other users, remote servers, remote applications.

Figure 2:
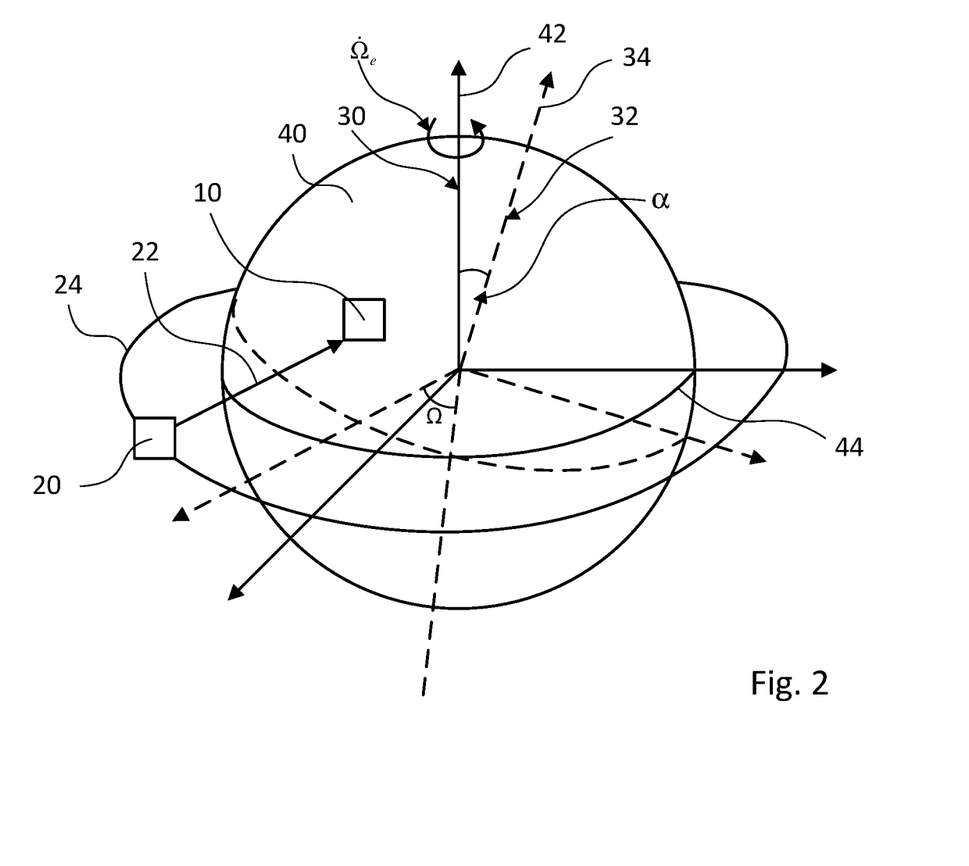
FIG. 2 shows a schematic view of a navigation satellite in an orbit and a navigation device on earth and FIG. 3 shows a schematic view of a system for determining navigation information.

FIG. 2 shows earth 40, the navigation device 10 of FIG. 1 and a first navigation satellite 20. The first navigation satellite 20 may orbit earth 40 in a geostationary orbit 24. The geostationary orbit 24 may at least essentially be within an equatorial plane 44 of earth. The navigation device 10 may be positioned somewhere on earth 40 within reach of a first signal 22 from the first navigation satellite 20. FIG. 2 further shows a first coordinate system 30 and a second coordinate system 32. The first coordinate system 30 may have two axis that are parallel to (or within) the equatorial plane 44. The second coordinate system 32 may be tilted in regard to the first coordinate system 30 by an angle $\alpha$. Two axis of the second corrdinate system 32 may span a plane that is tilted by the angle $\alpha$ in regard to the equatorial plane 44.

The navigation device 10 includes a receiving circuit 12. The receiving circuit 12 is configured to receive at least a first signal 22 from at least the first navigation satellite 20 (see FIG. 2). The first signal 22 provides at least a first timestamp $t_K$. The first navigation satellite 20 may be a geostationary satellite. The first navigation satellite 20 may be a BeiDou navigation satellite. The receiving circuit 12 may be configured to receive (timestamped) signals from further satellites. The further satellites may be geostationary, geosynchronous and/or medium earth orbit satellites.

The receiving circuit 12 may include at least one antenna 13 (or an antenna matrix) and an evaluation circuit 14. The evaluation circuit 14 may be configured to evaluate (analyze) signals received via the at least one antenna 13. The evaluation circuit 14 may be configured to measure the arrival time of timing signals broadcast by the navigation satellite (Code Phase) and the rate at which these signals arrive (Doppler), and also the phase of the carrier signal. The receiving circuit 12 may further be configured to receive the ephemeris data from the first navigation satellite 20. The evaluation circuit may be configured to decode low rate data (e.g. 50 bits per second), which is modulated on top of the timing signal. This low rate data may contain information about the navigation satellite constellation such as the ephemeris data. According to further embodiments the ephemeris data may be received via a separate receiving circuit and/or from a different source that the first satellite (e.g. via Internet, WiFi). The ephemeris data may be Keplerian form ephemeris data. Ephemeris data of a navigation satellite may be a set of data that define an orbit of the navigation satellite in relation to a given coordinate system (the second coordinate system) and a position of the navigation satellite at a reference time. Ephemeris data may include at least the reference time and further may include a square root of semi-major axis of orbit, an eccentricity of orbit, an argument of perigee of orbit, a mean motion difference (from computed value), a mean anomaly at reference time, a longitude of ascending node of orbital plane 24 (computed according to reference time), a rate of right ascension, an inclination angle (at the reference time), a rate (of change) of the inclination angle, Correction parameters and/or further. The ephemeris data of the first (and further) navigation satellite may be updated regularly, e.g. every two hours, to atone for changes of orbit, e.g. due to drifting of the navigation satellite towards a more stable/preferred orbit that differs from the intended orbit, or e.g. due to correction maneuvers of the navigation satellite that (appear from time to time) and/or other influences.

The navigation device 10 further includes a determination circuit 16. The evaluation circuit 14 (measuring engine, ME) may be configured to provide received data to the determination circuit 16.

The determination circuit 16 is configured to determine at least a velocity (velocity vector) $\dot{P}_K$ of the first navigation satellite in a first coordinate system 30 based on at least ephemeris data of the first navigation satellite 20 and the first timestamp $t_K$. The determination circuit 16 may be configured to determine at least a velocity of at least a part of the further navigation satellites, from which a timestamped signal was received, in the first coordinate system 30 based on at least ephemeris data of the respective navigation satellite and the respective timestamp. The ephemeris data of at least the first navigation satellite (and the further satellites) is provided in relation to a second coordinate 32 system.

The first coordinate system 30 is earth fixed. The first coordinate system 30 may be an orthogonal coordinate system. Alternatively the first coordinate system may be a polar coordinate system. The first coordinate system 30 may rotate together with earth 40. The first coordinate system 30 may rotate around the rotation axis 42 of earth 40 with the rotational speed of earth 40. A point of origin of the first coordinate system 30 may be fixed to a point (e.g. center) of earth 40. The first coordinate system 30 may be a China Geodetic Coordinate System (e.g. CGCS2000 or a future variation).

The second coordinate system 32 is at least tilted in relation (in regard) to the equatorial plane 44. The second coordinate system 32 may be tilted in relation to the equatorial plane 44 by at least 3 degrees, e.g. at least 4 degrees, e.g. at least 5 degrees. All axis of the second coordinate system 32 may enclose angles of at least 3 degrees, e.g. at least 4 degrees, e.g. at least 5 degrees, with the rotational axis 42 of the first coordinate system 30 (rotational axis of earth). The second coordinate system may include one axis 34 that has an angle α (e.g. a constant angle), e.g. between 1 and 179 degrees, e.g. between 1 and 90 degrees, e.g. between 1 and 40 degrees, e.g. between 2 and 20 degrees, e.g. between 3 and 10 degrees, e.g. between 4 and 7 degrees, e.g. of 5 degrees with the rotational axis 42 of the first coordinate system 30 (rotational axis of earth). The second coordinate system 32 may be an orthogonal coordinate system. The second coordinate system 32 may be at least essentially non-rotating in relation to the fixed stars. A point of origin of the second coordinate system 32 may be fixed to a point (e.g. center) of earth 40. The first and second coordinate systems 30, 32 may have the same point of origin.

The navigation device 10 further includes a navigation circuit 18 configured to determine navigation information (e.g. position, velocity, acceleration, direction of movement, orientation, and others) of the receiving circuit 12 within (in relation to) the first coordinate system based on at least the determined velocity of at least the first navigation satellite 20 (and the further satellites, e.g. at least 3 navigation satellites in total). Navigation information of the receiving circuit 12 may be understood as navigation information of the antenna 13 of the receiving circuit 12 and/or navigation information of a user handling the navigation device. The navigation circuit 18 may be configured to determine the navigation information based on position, velocity and/or acceleration of the first and further navigation satellites in the first coordinate system.

The determination circuit 16 may be provided to provide determined data, e.g. position, velocity and/or acceleration of the first satellite in the first coordinate system to the navigation circuit.

The navigation circuit 18, the determination circuit 16 and/or the evaluation circuit 14 may each be represented by an application specific integrated circuits (ASICs), as variable processing units (e.g. CPUs), or as multiple software entities on a same CPU. Two or more of the navigation circuit 18, the determination circuit 16 and/or the evaluation circuit 14 may be included into a single processing unit and/or software (in combination with a program/application). The determination circuit and the navigation circuit may be combined as a positioning engines (PE).

The determination circuit 16 may be configured to determine a position $P_{GK}$ of the first navigation satellite in the second coordinate 32 system at the first timestamp $t_K$ according to the following:

$$P_{GK} = \begin{pmatrix} X_{GK} \\ Y_{GK} \\ Z_{GK} \end{pmatrix} = \begin{pmatrix} \cos(\Omega_K) & -\sin(\Omega_K)\cos(i_K) & \sin(\Omega_K)\sin(i_K) \\ \sin(\Omega_K) & \cos(\Omega_K)\cos(i_K) & -\cos(\Omega_K)\sin(i_K) \\ 0 & \sin(i_K) & \cos(i_K) \end{pmatrix} \begin{pmatrix} x_K \\ y_K \\ 0 \end{pmatrix} \quad (1)$$

Herein $\Omega_K$ is the longitude of the corrected longitude of the ascending node at timestamp $t_K$, $(x_K, y_K, 0)^T$ is the position of the navigation satellite 20 within its orbital plane 24 at timestamp $t_K$, $i_K$ is the inclination at timestamp $t_K$. Herein $\Omega_K$, $x_K$, $y_K$ and $i_K$ are determined via the ephemeris data.

The determination circuit 16 may be configured to determine the position $P_K$ of the first navigation satellite in the first coordinate system 20 at the first timestamp $t_K$ using the transformation matrix $T(t_K)$ from the second to the first coordinate system:

$$P_K = T(t_K) \cdot P_{GK} = \begin{pmatrix} \cos(\dot{\Omega}_e t_K) & \sin(\dot{\Omega}_e t_K)\cos(\alpha) & -\sin(\dot{\Omega}_e t_K)\sin(\alpha) \\ -\sin(\dot{\Omega}_e t_K) & \cos(\dot{\Omega}_e t_K)\cos(\alpha) & \cos(\dot{\Omega}_e t_K)\sin(\alpha) \\ 0 & \sin(\alpha) & \cos(\alpha) \end{pmatrix} \begin{pmatrix} X_{GK} \\ Y_{GK} \\ Z_{GK} \end{pmatrix} \quad (2)$$

α herein is the tilt angle between the Z-axis of the first and second coordinate systems, e.g. 5 degrees. α may be the tilt angle between the earths rotational axis and the Z-axis of the second coordinate system, e.g. 5 degrees. $\dot{\Omega}_e$ is the rotation rate of the first coordinate system 30 in relation to the second coordinate system 32. $\dot{\Omega}_e$ may be the earth rotation rate (of CGCS2000). The determination circuit 16 may be configured to determine at least a velocity $\dot{P}_{GK}$ of the first navigation satellite 20 in the second coordinate system 32 from the ephemeris data:

$$\dot{P}_{GK} = \begin{pmatrix} \dot{X}_{GK} \\ \dot{Y}_{GK} \\ \dot{Z}_{GK} \end{pmatrix} = \quad (3)$$

$$\dot{\Omega}_K \begin{pmatrix} -\sin(\Omega_K) & -\cos(\Omega_K)\cos(i_K) & \cos(\Omega_K)\sin(i_K) \\ \cos(\Omega_K) & -\sin(\Omega_K)\cos(i_K) & \sin(\Omega_K)\sin(i_K) \\ 0 & 0 & 0 \end{pmatrix} \begin{pmatrix} x_K \\ y_K \\ 0 \end{pmatrix} +$$

-continued $$i\_dot \begin{pmatrix} 0 & \sin(\Omega_K)\sin(i_K) & \sin(\Omega_K)\cos(i_K) \\ 0 & -\cos(\Omega_K)\sin(i_K) & -\cos(\Omega_K)\cos(i_K) \\ 0 & \cos(i_K) & -\sin(i_K) \end{pmatrix} \begin{pmatrix} x_K \\ y_K \\ 0 \end{pmatrix} +$$

$$\begin{pmatrix} \cos(\Omega_K) & -\sin(\Omega_K)\cos(i_K) & \sin(\Omega_K)\sin(i_K) \\ \sin(\Omega_K) & \cos(\Omega_K)\cos(i_K) & -\cos(\Omega_K)\sin(i_K) \\ 0 & \sin(i_K) & \cos(i_K) \end{pmatrix} \begin{pmatrix} \dot{x}_K \\ \dot{y}_K \\ 0 \end{pmatrix}$$

Herein $\dot{\Omega}_K = \dot{\Omega}$ is the rate (of change) of the (right) ascension node and i_dot is the rate (of change) of the inclination. Both values may be provided as ephemeris data or be calculated therefrom. $(\dot{x}_K \, \dot{y}_K \, 0)^T$ is the velocity (vector) of the first navigation satellite in the orbital plane 24, as can be determined from the ephemeris data.

The determination circuit 16 may be configured to determine at least a time derivative of a transformation matrix between the second coordinate system 32 and the first coordinate system 30 for determining the velocity $\dot{P}_K$ of the first navigation satellite in the first coordinate system 30. The determination circuit may be configured to determine the velocity of the first navigation satellite by using the transformation matrix $T(t_K)$ to transform the velocity from the second to the first coordinate system and adding a correction by applying the time derivative of the transformation matrix $T(t_K)$ to the position of the first navigation satellite 20 in the second coordinate system:

$$\dot{P}_K = \begin{pmatrix} \dot{X}_K \\ \dot{Y}_K \\ \dot{Z}_K \end{pmatrix} = \dot{T}(t_K) \cdot P_{GK} + T(t_K) \cdot \dot{P}_{GK} = \tag{4}$$

$$\dot{\Omega}_e \begin{pmatrix} -\sin(\dot{\Omega}_e t_K) & \cos(\dot{\Omega}_e t_K)\cos(\alpha) & -\cos(\dot{\Omega}_e t_K)\sin(\alpha) \\ -\cos(\dot{\Omega}_e t_K) & -\sin(\dot{\Omega}_e t_K)\cos(\alpha) & \sin(\dot{\Omega}_e t_K)\sin(\alpha) \\ 0 & 0 & 0 \end{pmatrix} \begin{pmatrix} X_{GK} \\ Y_{GK} \\ Z_{GK} \end{pmatrix} +$$

$$\begin{pmatrix} \cos(\dot{\Omega}_e t_K) & \sin(\dot{\Omega}_e t_K)\cos(\alpha) & -\sin(\dot{\Omega}_e t_K)\sin(\alpha) \\ -\sin(\dot{\Omega}_e t_K) & \cos(\dot{\Omega}_e t_K)\cos(\alpha) & -\cos(\dot{\Omega}_e t_K)\sin(\alpha) \\ 0 & \sin(\alpha) & \cos(\alpha) \end{pmatrix} \begin{pmatrix} \dot{X}_{GK} \\ \dot{Y}_{GK} \\ \dot{Z}_{GK} \end{pmatrix}$$

The receiving circuit 12 (e.g. the evaluation circuit 14) may be configured to measure (or determine) a Doppler shift (e.g. a difference of the received carrier frequency to the nominal carrier frequency that is used by the satellite to send the signal) of at least the first signal 22. The navigation circuit 18 may be configured to determine at least a velocity of the receiving circuit within the first coordinate system, based on the Doppler shift of the first signal 22 (and the Doppler shift of signals of further navigation satellites) and the determined velocity of at least the first navigation satellite (and the further satellites for which a signal was received at the timestamp) in the first coordinate system. The navigation circuit may be configured to determine a relative velocity between the first navigation satellite and the receiving circuit from the Doppler shift. The navigation circuit may be configured to determine a differential velocity based on the determined relative velocity and the determined velocity of the first navigation satellite in the first coordinate system. The navigation circuit 18 may be configured to determine (estimate) a velocity of the receiving circuit based by finding (optimization problem) an user velocity for which an expected Doppler shift calculated/determined/computed based on the navigation satellite's velocity in the first coordinate system, the (estimated) user velocity (and a clock drift) fits the measured Doppler shift.

The determination circuit is configured to determine at least an acceleration $\ddot{P}_{GK}$ of the first navigation satellite in the second coordinate system 32 from the ephemeris data of the first navigation satellite and the first timestamp $t_K$:

$$\ddot{P}_{GK} = \begin{pmatrix} \ddot{X}_{GK} \\ \ddot{Y}_{GK} \\ \ddot{Z}_{GK} \end{pmatrix} = \tag{5}$$

$$\dot{\Omega}_K^2 \begin{pmatrix} -\cos(\Omega_K) & \sin(\Omega_K)\cos(i_K) & -\sin(\Omega_K)\sin(i_K) \\ -\sin(\Omega_K) & -\sin(\Omega_K)\cos(i_K) & \cos(\Omega_K)\sin(i_K) \\ 0 & 0 & 0 \end{pmatrix} \begin{pmatrix} x_K \\ y_K \\ 0 \end{pmatrix} +$$

$$i\_dot^2 \begin{pmatrix} 0 & \sin(\Omega_K)\sin(i_K) & -\sin(\Omega_K)\cos(i_K) \\ 0 & -\cos(\Omega_K)\sin(i_K) & \cos(\Omega_K)\cos(i_K) \\ 0 & -\sin(i_K) & -\cos(i_K) \end{pmatrix} \begin{pmatrix} x_K \\ y_K \\ 0 \end{pmatrix} +$$

$$2 \cdot \dot{\Omega}_K \cdot i\_dot \begin{pmatrix} 0 & \cos(\Omega_K)\sin(i_K) & -\cos(\Omega_K)\cos(i_K) \\ 0 & \sin(\Omega_K)\sin(i_K) & \sin(\Omega_K)\cos(i_K) \\ 0 & 0 & 0 \end{pmatrix} \begin{pmatrix} x_K \\ y_K \\ 0 \end{pmatrix} +$$

$$2 \cdot \dot{\Omega}_K \begin{pmatrix} -\sin(\Omega_K) & -\cos(\Omega_K)\cos(i_K) & \cos(\Omega_K)\sin(i_K) \\ \cos(\Omega_K) & -\sin(\Omega_K)\cos(i_K) & \sin(\Omega_K)\sin(i_K) \\ 0 & 0 & 0 \end{pmatrix} \begin{pmatrix} \dot{x}_K \\ \dot{y}_K \\ 0 \end{pmatrix} +$$

$$2 \cdot i\_dot \begin{pmatrix} 0 & \sin(\Omega_K)\sin(i_K) & \sin(\Omega_K)\cos(i_K) \\ 0 & -\cos(\Omega_K)\sin(i_K) & -\cos(\Omega_K)\cos(i_K) \\ 0 & \cos(i_K) & -\sin(i_K) \end{pmatrix} \begin{pmatrix} \dot{x}_K \\ \dot{y}_K \\ 0 \end{pmatrix} +$$

$$\begin{pmatrix} \cos(\Omega_K) & -\sin(\Omega_K)\cos(i_K) & \sin(\Omega_K)\sin(i_K) \\ \sin(\Omega_K) & \cos(\Omega_K)\cos(i_K) & -\cos(\Omega_K)\sin(i_K) \\ 0 & \sin(i_K) & \cos(i_K) \end{pmatrix} \begin{pmatrix} \ddot{x}_K \\ \ddot{y}_K \\ 0 \end{pmatrix}$$

Herein $(\ddot{x}_K \, \ddot{y}_K \, 0)^T$ is the acceleration (vector) of the first navigation satellite in the orbital plane 24, as can be determined from the ephemeris data.

The determination circuit 16 may be configured to determine at least an acceleration $\ddot{P}_K$ of the first navigation satellite in the first coordinate system 30. It may be determined by transforming the acceleration $\ddot{P}_{GK}$ of the first navigation satellite in the second coordinate system 32 and correcting by terms comprising a first order time derivative of the transformation matrix $T(t_K)$ and by terms comprising a second order time derivation of the transformation matrix $T(t_K)$:

$$\ddot{P}_K = \begin{pmatrix} \ddot{X}_K \\ \ddot{Y}_K \\ \ddot{Z}_K \end{pmatrix} = \ddot{T}(t_K) \cdot P_{GK} + 2\dot{T}(t_K) \cdot \dot{P}_{GK} + T(t_K) \cdot \ddot{P}_{GK} = \tag{6}$$

$$\dot{\Omega}_e^2 \begin{pmatrix} -\cos(\dot{\Omega}_e t_K) & -\sin(\dot{\Omega}_e t_K)\cos(\alpha) & \sin(\dot{\Omega}_e t_K)\sin(\alpha) \\ \sin(\dot{\Omega}_e t_K) & -\cos(\dot{\Omega}_e t_K)\cos(\alpha) & \cos(\dot{\Omega}_e t_K)\sin(\alpha) \\ 0 & 0 & 0 \end{pmatrix} \begin{pmatrix} X_{GK} \\ Y_{GK} \\ Z_{GK} \end{pmatrix} +$$

-continued $$2\cdot\Omega_e\begin{pmatrix} -\sin(\Omega_e t_K) & \cos(\Omega_e t_K)\cos(\alpha) & -\cos(\Omega_e t_K)\sin(\alpha) \\ -\cos(\Omega_e t_K) & -\sin(\Omega_e t_K)\cos(\alpha) & \sin(\Omega_e t_K)\sin(\alpha) \\ 0 & 0 & 0 \end{pmatrix}$$

$$\begin{pmatrix} \dot{X}_{GK} \\ \dot{Y}_{GK} \\ \dot{Z}_{GK} \end{pmatrix} +$$

$$\begin{pmatrix} \cos(\Omega_e t_K) & \sin(\Omega_e t_K)\cos(\alpha) & -\sin(\Omega_e t_K)\sin(\alpha) \\ -\sin(\Omega_e t_K) & \cos(\Omega_e t_K)\cos(\alpha) & -\cos(\Omega_e t_K)\sin(\alpha) \\ 0 & \sin(\alpha) & \cos(\alpha) \end{pmatrix}\begin{pmatrix} \ddot{X}_{GK} \\ \ddot{Y}_{GK} \\ \ddot{Z}_{GK} \end{pmatrix}$$

The determination circuit 16 may be configured to determine at least a position of the first navigation satellite for the first timestamp from the ephemeris data. The determination circuit 16 may be configured to determine at least a position of the further navigation satellites for the first timestamp from the respective ephemeris data. The determination circuit 16 may be configured to determine at least the position and/or the velocity of the first navigation satellite in the first coordinate system for at least one further timestamp based on at least the position, velocity and acceleration (and/or further derivatives as jerk and snap) determined for the first timestamp and a time difference between the first and further timestamp, e.g. when the difference between the first and further timestamp is less than 10 minutes, e.g. less than 5 minutes, e.g. less than 1 minute, e.g. less than 30 seconds, e.g. less than 15 seconds, e.g. by polynomial motion formulas. The further timestamp may be transmitted via a further signal from the first navigation satellite 20. The further timestamp may be later than the first timestamp. The determination circuit may be configured to calculate position and/or velocity of the first navigation satellite for the further timestamp in the first coordinate system from the ephemeris data when the first timestamp is more than 15 seconds, e.g. more than 30 seconds, e.g. more than 1 minute, e.g. more than 5 minutes, e.g. more than 10 minutes, older than the further timestamp. This may allow a high efficiency and/or reduce power consumption and/or time consumption, e.g. since less complex calculations are needed.

According to further embodiments the determination circuit 16 may be configured to determine position, velocity and acceleration data of at least the first navigation satellite in the first coordinate system at least for a first reference time, e.g. in a periodical fashion, e.g. every 30 seconds, from the ephemeris data, e.g. independent of a received timestamp. The determination circuit 16 may be configured to determine at least the position and/or the velocity of the first navigation satellite in the first coordinate system for at least the first timestamp based on the position, velocity and acceleration determined for the first reference time and a time difference between the first reference time and the first timestamp, e.g. when the difference is less than 10 minutes, e.g. less than 5 minutes, e.g. less than 1 minute, e.g. less than 30 seconds, e.g. less than 15 seconds, e.g. by polynomial motion formulas.

Figure 3:
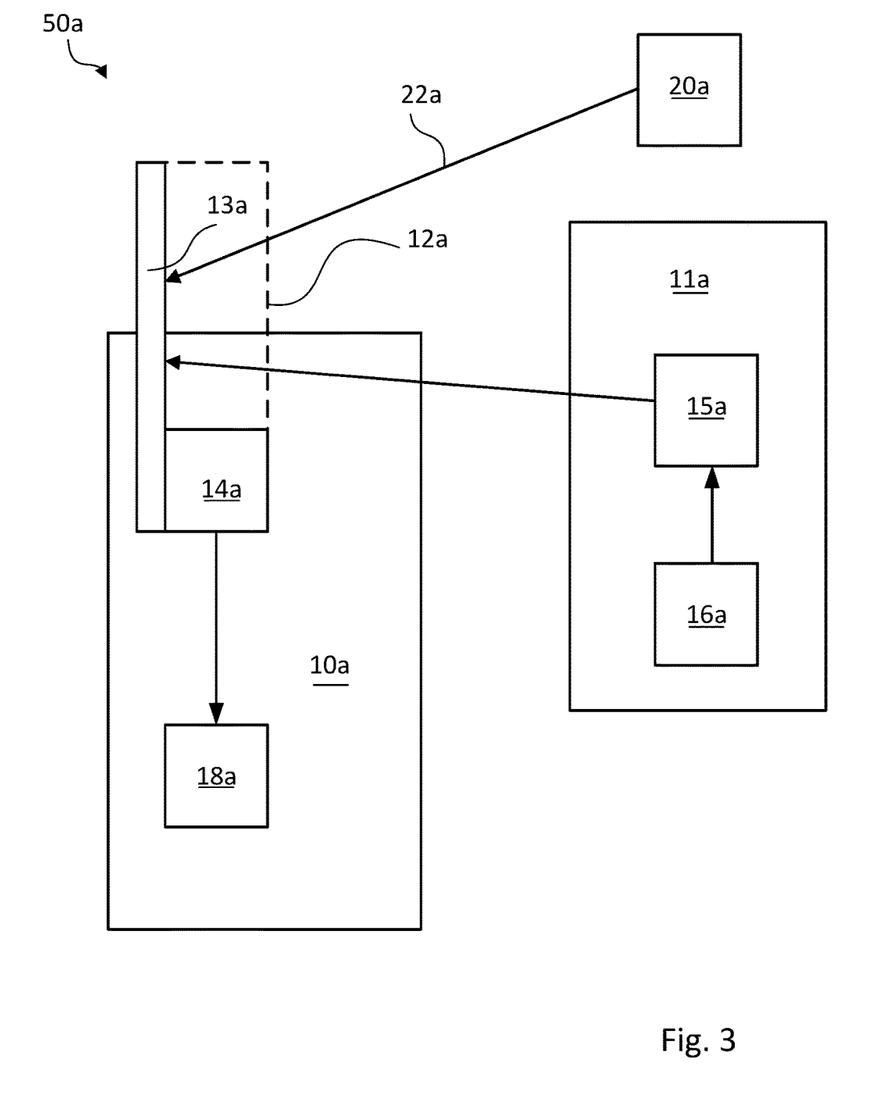

FIG. 3 shows a system 50a for determining navigation information of a navigation device 10a. The system 50a includes a determination device 11a and the navigation device 10a. The determination device 11a includes a determination circuit 16a. The determination circuit 16a is configured to determine a velocity of a first navigation satellite 20a for a first timestamp in a second coordinate system based on ephemeris data of the first navigation satellite 20a (for detailed description of the functionality of the determination circuit please refer to the descpricon of FIGS. 1 and 2). The second coordinate system is tilted in relation to the equatorial plane. The determination circuit 16a is further configured to determine a velocity of the first navigation satellite in a first coordinate system that is earth fixed and rotating with earth. The determination circuit 16 may be configured to determine the velocity of the first navigation satellite 20a in the first coordinate system by applying a transformation matrix to the determined velocity of the first navigation satellite 20a in the second coordinate system and adding a correction term based on a time derivative of the transformation matrix. The determination device 11a further comprises a communication circuit 15a for sending the determined velocity of the first navigation satellite 20a in the first coordinate system to the navigation device 10a. The navigation device 10a comprises a receiving circuit 12a configured to receive a first signal 22a from the first navigation satellite, the first signal comprising the first timestamp. The receiving circuit 12a is further configured to receive the determined velocity of the first navigation satellite 20a in the first coordinate system from the determination device 11a. The receiving circuit 12a may include an antenna 13a and an evaluation circuit 14a. The navigation device further comprises a navigation circuit 18a configured to determine the navigation information of the receiving circuit 12a within the first coordinate system based on at least the determined velocity of at least the first navigation satellite 20a.

The determination device 11a may be configured to be included into the first navigation satellite 20a. The system 50a may further include the first navigation satellite 20a. The determination device 11a may be included into the first navigation satellite 20a. The determined velocity (of at least the first navigation satellite 20a in the first coordinate system) may be included in the first signal 22a.

According to further embodiments, the navigation device 10a may include a communication circuit for sending the timestamp received from the first navigation satellite to the determination circuit 11a.

According to various embodiments, the determination device may be configured to receive (e.g. via the communication circuit) the ephemeris data of the first navigation satellite from the navigation device, from the first navigation satellite and/or from a central distribution system (server, e.g. via a communication network connection/internet connection). More than one way of receiving the ephemeis data may be used at the same time to ensure best possible coverage, accuracy, flexibility, and/or response time.

EXAMPLES

The following examples pertain to further embodiments.

Example 1 is a navigation device comprising: a receiving circuit configured to receive a first signal from a first navigation satellite, the first signal comprising a first timestamp; a determination circuit configured to determine a velocity of the first navigation satellite at the first timestamp in a second coordinate system based on ephemeris data of the first navigation satellite, the second coordinate system being tilted in relation to the equatorial plane; the determination circuit further configured to determine a velocity of the first navigation satellite in a first coordinate system that is earth fixed and rotating with earth based on the determined velocity in the second coordinate system; a navigation circuit configured to determine navigation information of the receiving circuit within the first coordinate system based on at least the determined velocity of at least the first navigation satellite.

In example 2, the subject matter of example 1 can optionally include that the determination circuit is configured to determine the velocity of the first navigation satellite in the first coordinate system by applying a transformation matrix to the determined velocity of the first navigation satellite in the second coordinate system and adding a correction term based on a time derivative of the transformation matrix.

In example 3, the subject matter of any of examples 1-2 can optionally include that the navigation circuit is configured to determine at least a velocity of the receiving circuit within the first coordinate system, based on a Doppler shift of the first signal and the determined velocity of at least the first navigation satellite.

In example 4, the subject matter of any of examples 1-3 can optionally include that the receiving circuit is configured to receive the ephemeris data from the first navigation satellite.

In example 5, the subject matter of any of examples 1-4 can optionally include that the second coordinate system is tilted in relation to the equatorial plane by at least 3 degrees.

In example 6, the subject matter of any of examples 1-5 can optionally include that the first navigation satellite is a geostationary satellite.

In example 7, the subject matter of any of examples 1-6 can optionally include that the first navigation satellite is a BeiDou navigation satellite.

In example 8, the subject matter of any of examples 1-7 can optionally include that the first coordinate system is a China Geodetic Coordinate System.

In example 9, the subject matter of any of examples 1-8 can optionally include that the determination circuit is configured to determine at least an acceleration of the first navigation satellite in the first coordinate system from the ephemeris data of the first navigation satellite and the first timestamp.

In example 10, the subject matter of example 9 can optionally include that the determination circuit is configured to determine at least an acceleration of the first navigation satellite in the second coordinate system from the ephemeris data for determining the acceleration of the first navigation satellite in the first coordinate system.

In example 11, the subject matter of any of examples 9-10 can optionally include that the determination circuit is configured to determine at least a second order time derivative of a transformation matrix between the first coordinate system and the second coordinate system for determining the acceleration of the first navigation satellite in the first coordinate system.

In example 12, the subject matter of any of examples 9-11 can optionally include that the determination circuit is configured to determine a position of the first navigation satellite for the first timestamp from the ephemeris data and is configured to determine at least the position of the first navigation satellite in the first coordinate system for at least one further timestamp based on at least the position, velocity and acceleration determined for the first timestamp and a time difference between the first and further timestamp.

Example 13 is a method for determining navigation information, the method comprising: receiving at least a first signal from at least a first navigation satellite, the signal comprising a first timestamp; determining a velocity of the first navigation satellite at the first timestamp in a second coordinate system based on ephemeris data of the first navigation satellite, the second coordinate system being tilted in relation to the equatorial plane; determining a velocity of the first navigation satellite in a first coordinate system that is earth fixed and rotating with earth based on the determined velocity in the second coordinate system; determining navigation information of the receiving circuit within the first coordinate system based on at least the determined velocity of at least the first navigation satellite.

In example 14, the subject matter of example 13 can optionally include that determining the velocity of the first navigation satellite in the first coordinate system includes applying a transformation matrix to the determined velocity of the first navigation satellite in the second coordinate system and adding a correction term based on a time derivative of the transformation matrix.

In example 15, the subject matter of any of examples 13-14 can optionally include that determining navigation information includes determining at least a velocity of the receiving circuit within the first coordinate system, based on a Doppler shift of the first signal and the velocity of at least the first navigation satellite.

In example 16, the subject matter of any of examples 13-15 can optionally include: receiving the ephemeris data from the first navigation satellite.

In example 17, the subject matter of any of examples 13-16 can optionally include that the second coordinate system is tilted in relation to the equatorial plane by at least 3 degrees.

In example 18, the subject matter of any of examples 13-17 can optionally include that the first navigation satellite is a geostationary satellite.

In example 19, the subject matter of any of examples 13-18 can optionally include that the first navigation satellite is a BeiDou navigation satellite.

In example 20, the subject matter of any of examples 13-19 can optionally include that the first coordinate system is a China Geodetic Coordinate System.

In example 21, the subject matter of any of examples 13-20 can optionally include: determine at least an acceleration of the first navigation satellite in the first coordinate system from the ephemeris data of the first navigation satellite and the first timestamp.

In example 22, the subject matter of example 21 can optionally include that determining the acceleration of the first navigation satellite in the first coordinate system comprises determining at least an acceleration of the first navigation satellite in the second coordinate system from the ephemeris data for.

In example 23, the subject matter of any of examples 21-22 can optionally include that determining the acceleration of the first navigation satellite in the first coordinate system comprises determining at least a second order time derivative of a transformation matrix between the first coordinate system and the second coordinate system for.

In example 24, the subject matter of any of examples 21-23 can optionally include: determining a position of the first navigation satellite for the first timestamp from the ephemeris data and determining at least the position of the first navigation satellite in the first coordinate system for at least one further timestamp based on at least the position, velocity and acceleration determined for the first timestamp and a time difference between the first and further timestamp.

Example 25 is a determination device in a system for determining navigation information of a navigation device, the determination device comprising: a determination circuit and a communication circuit, the determination circuit configured to determine a velocity of a first navigation satellite for a first timestamp in a second coordinate system based on ephemeris data of the first navigation satellite, the second coordinate system being tilted in relation to the equatorial plane; the determination circuit further configured to determine a velocity of the first navigation satellite in a first coordinate system that is earth fixed and rotating with earth based on the determined velocity in the second coordinate system; the communication circuit configured to send the determined velocity to the navigation device.

In example 26, the subject matter of example 25 can optionally include that the determination circuit is configured to determine the velocity of the first navigation satellite in the first coordinate system by applying a transformation matrix to the determined velocity of the first navigation satellite in the second coordinate system and adding a correction term based on a time derivative of the transformation matrix.

In example 27, the subject matter of any of examples 25-26 can optionally include that the communication circuit is configured to receive the timestamp from the navigation device and provide the timestamp to the determination circuit.

In example 28, the subject matter of any of examples 25-27 can optionally include that the determination device is configured to be included into the first navigation satellite.

In example 29, the subject matter of any of examples 25-28 can optionally include that the communication circuit is configured to send the first time stamp together with the determined velocity for the first time stamp to the navigation device.

In example 30, the subject matter of any of examples 25-29 can optionally include that the communication circuit is configured to receive the ephemeris data of the first navigation satellite and provide it to the determination circuit.

What is claimed is:

1. A navigation device comprising:
   a receiving circuit configured to receive a first signal from a first navigation satellite identifiable in a first coordinate system and a second coordinate system, the first signal comprising a first timestamp;
   a determination circuit configured to determine a velocity of the first navigation satellite at the first timestamp in the second coordinate system based on ephemeris data of the first navigation satellite, the second coordinate system being tilted in relation to the equatorial plane;
   the determination circuit further configured to:
      determine a velocity of the first navigation satellite in the first coordinate system that is earth fixed and rotating with earth based on the determined velocity in the second coordinate system;
      determine at least an acceleration of the first navigation satellite in the first coordinate system from the ephemeris data of the first navigation satellite and the first timestamp; and
      determine at least a second order time derivative of a transformation matrix between the first coordinate system and the second coordinate system for determining the acceleration of the first navigation satellite in the first coordinate system; and
   a navigation circuit configured to determine navigation information of the receiving circuit within the first coordinate system based on at least the determined velocity of at least the first navigation satellite.

2. The navigation device of claim 1,
   wherein the determination circuit is configured to determine the velocity of the first navigation satellite in the first coordinate system by applying a transformation matrix to the determined velocity of the first navigation satellite in the second coordinate system and adding a correction term based on a time derivative of the transformation matrix.

3. The navigation device of claim 1,
   wherein the navigation circuit is configured to determine at least a velocity of the receiving circuit within the first coordinate system, based on a Doppler shift of the first signal and the determined velocity of at least the first navigation satellite.

4. The navigation device of claim 1,
   wherein the receiving circuit is configured to receive the ephemeris data from the first navigation satellite.

5. The navigation device of claim 1,
   wherein the second coordinate system is tilted in relation to the equatorial plane by at least 3 degrees.

6. The navigation device of claim 1,
   wherein the first navigation satellite is a geostationary satellite.

7. The navigation device of claim 1,
   wherein the first navigation satellite is a BeiDou navigation satellite.

8. The navigation device of claim 1,
   wherein the first coordinate system is a China Geodetic Coordinate System.

9. The navigation device of claim 1,
   wherein the determination circuit is configured to determine at least an acceleration of the first navigation satellite in the second coordinate system from the ephemeris data for determining the acceleration of the first navigation satellite in the first coordinate system.

10. The navigation device of claim 1,
    wherein the determination circuit is configured to determine a position of the first navigation satellite for the first timestamp from the ephemeris data and is configured to determine at least the position of the first navigation satellite in the first coordinate system for at least one further timestamp based on at least the position, velocity and acceleration determined for the first timestamp and a time difference between the first timestamp and the at least one further timestamp.

11. A method for determining navigation information, the method comprising:
    receiving at least a first signal from at least a first navigation satellite identifiable in a first coordinate system and a second coordinate system, the signal comprising a first timestamp;
    determining a velocity of the first navigation satellite at the first timestamp in the second coordinate system based on ephemeris data of the first navigation satellite, the second coordinate system being tilted in relation to the equatorial plane;
    determining a velocity of the first navigation satellite in the first coordinate system that is earth fixed and rotating with earth based on the determined velocity in the second coordinate system;
    determining at least an acceleration of the first navigation satellite in the first coordinate system from the ephemeris data of the first navigation satellite and the first timestamp;
    determining at least a second order time derivative of a transformation matrix between the first coordinate system and the second coordinate system for determining the acceleration of the first navigation satellite in the first coordinate system; and determining navigation information within the first coordinate system based on at least the determined velocity of at least the first navigation satellite.

12. The method of claim 11, wherein determining the velocity of the first navigation satellite in the first coordinate system includes applying a transformation matrix to the determined velocity of the first navigation satellite in the second coordinate system and adding a correction term based on a time derivative of the transformation matrix.

13. The method of claim 11, wherein determining navigation information includes determining at least a velocity within the first coordinate system based on a Doppler shift of the first signal and the velocity of at least the first navigation satellite.

14. The method of claim 11, further comprising: receiving the ephemeris data from the first navigation satellite.

15. The method of claim 11, wherein the second coordinate system is tilted in relation to the equatorial plane by at least 3 degrees.

16. The method of claim 11, wherein the first navigation satellite is a geostationary satellite.

17. The method of claim 11, wherein the first navigation satellite is a BeiDou navigation satellite.

18. The method of claim 11, wherein the first coordinate system is a China Geodetic Coordinate System.

19. The method of claim 11, wherein determining the acceleration of the first navigation satellite in the first coordinate system comprises determining at least an acceleration of the first navigation satellite in the second coordinate system from the ephemeris data.

20. The method of claim 11, further comprising: determining a position of the first navigation satellite for the first timestamp from the ephemeris data and determining at least the position of the first navigation satellite in the first coordinate system for at least one further timestamp based on at least the position, velocity and acceleration determined for the first timestamp and a time difference between the first timestamp and the at least one further timestamp.

21. A determination device in a system for determining navigation information of a navigation device, the determination device comprising:

a determination circuit, wherein the determination circuit is configured to determine a velocity of a first geostationary navigation satellite for a first timestamp in a second coordinate system based on ephemeris data of the first geostationary navigation satellite, the second coordinate system being tilted in relation to the equatorial plane, and wherein the first geostationary navigation satellite is identifiable in a first coordinate system and the second coordinate system;

the determination circuit further configured to:
determine a velocity of the first geostationary navigation satellite in a first coordinate system that is earth fixed and rotating with earth based on the determined velocity in the second coordinate system;

determine at least an acceleration of the first navigation satellite in the first coordinate system from the ephemeris data of the first navigation satellite and the first timestamp; and determine at least a second order time derivative of a transformation matrix between the first coordinate system and the second coordinate system for determining the acceleration of the first navigation satellite in the first coordinate system; and a communication circuit configured to send the determined velocity to the navigation device.

22. The determination device of claim 21, wherein the determination circuit is configured to determine the velocity of the first navigation satellite in the first coordinate system by applying a transformation matrix to the determined velocity of the first navigation satellite in the second coordinate system and adding a correction term based on a time derivative of the transformation matrix.

23. The determination device of claim 21, wherein the second coordinate system is tilted in relation to the equatorial plane by at least 3 degrees.

24. The determination device of claim 21, wherein the first navigation satellite is at least one of:
a geostationary satellite;
a BeiDou navigation satellite; or
a China Geodetic Coordinate System.

25. The determination device of claim 21, wherein the determination circuit is configured to determine at least an acceleration of the first navigation satellite in the second coordinate system from the ephemeris data for determining the acceleration of the first navigation satellite in the first coordinate system.

* * * * *